United States Patent [19]
Betz et al.

[11] Patent Number: 5,200,747
[45] Date of Patent: Apr. 6, 1993

[54] TURN COUNTING POSITION SENSOR

[75] Inventors: James W. Betz, Ogden; William I. Buchanan, North Ogden, both of Utah

[73] Assignee: Bourns, Inc., Riverside, Calif.

[21] Appl. No.: 627,077

[22] Filed: Dec. 13, 1990

[51] Int. Cl.$^5$ .................... G08C 19/16; H01C 10/32; H01C 10/00

[52] U.S. Cl. .................. 340/870.21; 338/171; 338/196; 324/714

[58] Field of Search ............... 340/870.21, 870.38, 340/870.02; 338/171, 202, 118, 130, 131, 132, 134, 128, 196; 324/78 R, 82, 114, 176, 691, 714, 723; 73/118.1, 488, 513; 180/23; 116/31, DIG. 21

[56] References Cited

U.S. PATENT DOCUMENTS

| | | | |
|---|---|---|---|
| 2,564,284 | 8/1951 | Schurr | 318/33 |
| 3,139,571 | 6/1964 | Tucker et al. | 318/28 |
| 3,254,283 | 5/1966 | Hunt | 318/29 |
| 3,609,498 | 9/1971 | Andersen et al. | 318/665 |
| 3,673,561 | 6/1972 | Bronstein | 340/52 R |
| 3,812,712 | 5/1974 | Hoffman et al. | 73/188 |
| 4,054,825 | 10/1977 | Baxter | 318/663 |
| 4,403,179 | 9/1983 | Kohzai et al. | 318/632 |
| 4,621,250 | 11/1986 | Echasseriau et al. | 338/162 |
| 4,694,272 | 9/1987 | Maisch | 338/171 |
| 4,706,062 | 11/1987 | Mannle | 338/171 |
| 4,728,923 | 3/1988 | Finger | 340/52 R |
| 4,743,882 | 5/1988 | Simon | 338/184 |
| 4,821,016 | 4/1989 | Zeller | 116/31 |
| 4,839,579 | 6/1989 | Ito | 116/31 |
| 4,994,752 | 2/1991 | Hata | 338/171 |
| 5,010,784 | 4/1991 | Nakazato | 116/31 |
| 5,113,172 | 5/1992 | Lang | 338/171 |

*Primary Examiner*—Donald J. Yusko
*Assistant Examiner*—R. Gray
*Attorney, Agent, or Firm*—Howard J. Klein; Michael E. Whitham

[57] ABSTRACT

A position sensor (25) includes both a position potentiometer (90) and a turns count potentiometer (92). The position potentiometer (90) includes a pair of wipers (12 and 14) positioned on a rotor (10) which each contact both a resistive track (46) and one of two different commutator tracks (48 and 50) on element (26). The sensed percentage of total voltage output, which is a function of the position the wiper (12 or 14) contacts the resistive track (46), corresponds to the angular position between 0° and 360° of the shaft on which the position sensor (25) is mounted. The turns count potentiometer (92) comprises a turns count rotor (66) which is incrementally advanced via a cog (18) on rotor (10) using a gear or geneva type mechanism. The turns count rotor (66) includes a wiper (64) which either contacts both a resistive track (150) and commutator track (152) or contacts one of a plurality of switch pads (154). By determining the sensed voltage output from the turns count potentiometer (92) or identifying which switch pad (154) the wiper (64) has contacted, the number and direction of full revolutions of rotor (10) can be determined. The precise angle of the shaft on which the position sensor (25) is mounted is determined by adding the resulting angles obtained from the position potentiometer (90) and turns count potentiometer (92).

31 Claims, 6 Drawing Sheets

TURN COUNTING POSITION SENSOR

BACKGROUND OF THE INVENTION

1. Field of the Invention

The present invention generally relates to position sensors used for sensing the absolute position of a steering wheel or other like device which normally undergoes more than a single revolution during normal use.

2. Description of the Prior Art

There are many applications which require monitoring the angular rotation of a shaft. For example, in the automotive environment the position or rate of change of the steering wheel is used to activate safety devices such as lighting directed into a turning lane, cancel turn signals upon completion of a turn, and provide an input for rear wheel steering in some of today's modern cars. A single turn potentiometer alone is, of course, unsuitable for monitoring the angular position of a steering wheel since a single turn potentiometer can only be used to sense the relative position of a shaft for only one revolution, and the steering wheel of most automobiles must be rotated more than one and typically more than two complete revolutions to execute a hard left or right turn. Common mechanisms used today to monitor the relative position of a shaft that rotates more than one revolution include various pulse counting circuitry arrangements and using multi-turn or gear driven potentiometer devices.

In the pulse counting circuitry schemes, incremental pulses generated by optical or magnetic pulse sensing circuitry are counted and are used to calculate relative position. These systems assume an initial starting or home position upon energizing. After activating the sensors, any movement of the rotary shaft under test is then translated as a position relative to the assumed starting point. A disadvantage of the pulse counting circuitry schemes is that the index or home position is redefined each time the sensor is re-activated after power has been removed from the system. If the sensors do not have a memory feature which stores the last known position or the position is changed during the power off mode, the home location established on re-activation will be in error. In more advanced pulse counting systems, error correction is often provided via a mathematical time based algorithm that averages the implied position readings from the sensor to statistically impute the normal index position. However, this type of correction method may not be satisfactory due to the time period required for the system to gain enough readings in order to redefine the index position. In addition, circumstances could prevail that the algorithm cannot address correctly.

Multi-turn or gear driven potentiometers have not proven to be satisfactory since, in order to mechanically perform their function, the devices tend to become bulky or unreliable due to their added complexity. Accuracy and resolution in the gear driven device is sacrificed because it must mechanically resolve multiple turns in less than one full potentiometer revolution.

SUMMARY OF THE INVENTION

It is therefore an object of the present invention to provide a position sensor which overcomes the disadvantages of the prior art.

It is another object of the present invention to provide a position sensor that can sense the angular position of a device which is ordinarily rotated more than one complete revolution.

According to the invention, a position sensor has been provided which includes two single turn potentiometers. The first potentiometer is used to determine the angle of rotation of the rotating device from 0°-360° and the second potentiometer is used to determine the number of complete revolutions of the rotating device. The rotor of the second potentiometer is driven by a cog and pinion arrangement where the cog is secured to the first potentiometer. Each time the first potentiometer is rotated one complete revolution, the cog advances the pinion which rotates the rotor of the second potentiometer by a predetermined angle. By determining the percentage of electric output for both the first and second potentiometers, the exact degree of rotation of the device being monitored can be determined. Hence, if the position sensor is mounted on the steering wheel of an automobile and the steering wheel has been rotated 740° to make a hard right turn, the second potentiometer will produce a percentage electrical output indicating two revolutions or 720° and first potentiometer will produce a percentage electrical output indicating an angular position of 20°.

Preferably, the first potentiometer includes a pair of wipers which are angularly offset, one resistive track, and two commutator tracks positioned on either side of the resistive track. The first wiper, which is the leading wiper, contacts the first commutator track and the resistive track. Likewise, the second wiper, which is the following wiper, contacts the second commutator track and the resistive track. To increase position sensing accuracy near the full rotation point of the resistive track, circuitry is provided to switch from monitoring the leading wiper when it reaches a preset voltage output on the resistive track, say 95%, to monitoring the following wiper, which will have a known voltage output less than the leading wiper. After the leading wiper crosses over the end terminations of the resistive track, a position which would have resulted in an open signal condition, the circuitry switches back to monitoring the leading wiper. Switching back monitoring from the following wiper to the leading wiper would occur when the leading wiper yields a preset voltage output such as 5%.

In an alternative arrangement to using a second potentiometer for keeping track of the number of revolutions of the first potentiometer, it is anticipated that a binary counter arrangement could be used wherein the incrementally advanced rotor contacts one of a plurality of switch pads. The precise number of revolutions of the first potentiometer and the direction in which those revolutions occurred will be determined in accordance with the particular switch pad that is contacted by the wiper. A particular advantage of the switch pad arrangement is that no calculations correlating the percentage of voltage output to the position of the second rotor need to be performed as would be the case if a second potentiometer were used to count the turns of the first potentiometer.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
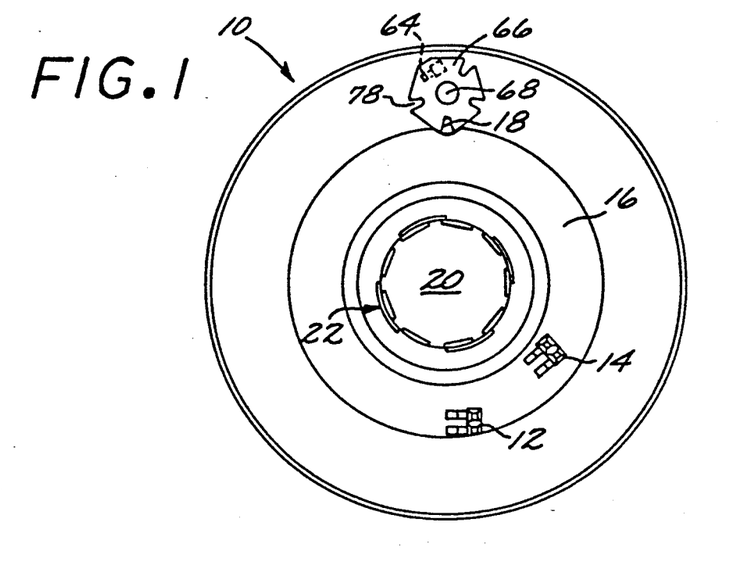
FIG. 1 is a top view of a rotor showing two wipers and a cog for driving a turns count rotor.
Figure 2:
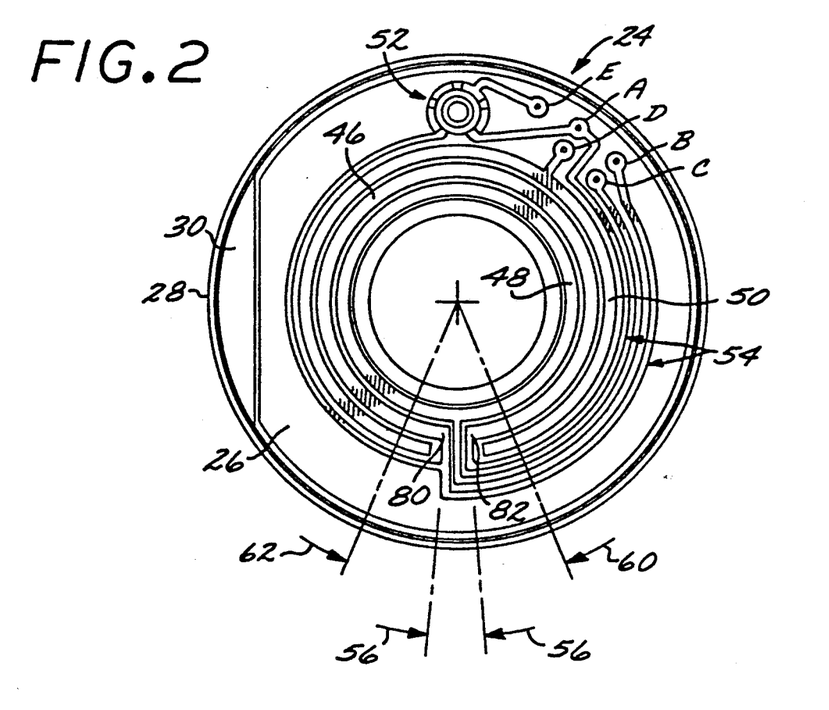
FIG. 2 is a bottom view of a stator showing a first resistive track and two commutator tracks which cooperate with the two wipers on the rotor of FIG. 1 and a second resistive track which cooperates with the turns count rotor of FIG. 1.
Figure 3:
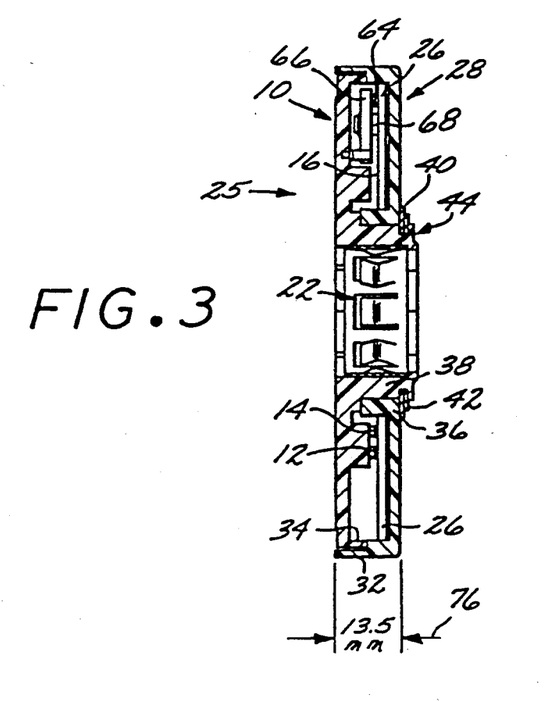
FIG. 3 is a cross-sectional side view of the position sensor wherein the rotor of FIG. 1 has been combined with the stator of FIG. 2.

Referring now to the drawings, and more particularly to FIGS. 1–3, there is shown a rotor assembly 10 which includes a pair of wipers 12 and 14 mounted on a plateau region 16 and a cog 18 projecting upward in the same direction as the plateau region 16. The rotor assembly 10 is snugly affixed to a rotatable shaft (not shown), such as a steering wheel linkage or the like, which fits through a central opening 20 in the rotor 10 by a coupling mechanism such as inwardly projecting spring clips 22 which prevent any relative slippage between the rotatable shaft and the rotor 10 during normal load conditions. The advantage of the spring clips 22 is that no further gearing or miscellaneous actuating hardware is required to affix the rotor assembly 10 to the rotatable shaft. Other coupling mechanisms, such as the shaft and the central opening 20 having matching square or octagonal dimensions, are understood to be within the scope of the present invention.

The rotor assembly 10 mates with an element and housing assembly 24 to form the position sensor 25, as shown in FIG. 3, wherein the element 26 fits within the housing assembly 28 and is held in a fixed position via a stationary attachment of trapping feature 30. Hence, in the preferred embodiment the element 26 is the stator against which the wipers 12 and 14 are rotated; however, it is anticipated that an opposite configuration could be used where the element 26 is rotated against stationary wipers 12 and 14. The housing assembly 28 includes an outer downwardly projecting flange 32 which interfits with an outer upwardly projecting flange 34 of the rotor assembly 10 such that the element 26 and wipers 12 and 14 are kept clean from dirt, water, and other adverse debris. In addition, the housing assembly 28 includes an inner downwardly projecting flange 36 which rides against the outside wall of an inner upwardly projecting flange 38 of the rotor assembly 10. Preferably, the rotor assembly 10 and housing assembly 28 are injection or press molded plastic parts which are naturally slippery so that the housing assembly 28 exerts very little frictional drag against the rotor assembly 10 at the inner and outer downwardly projecting flanges 32 and 36, respectively.

Figure 4:
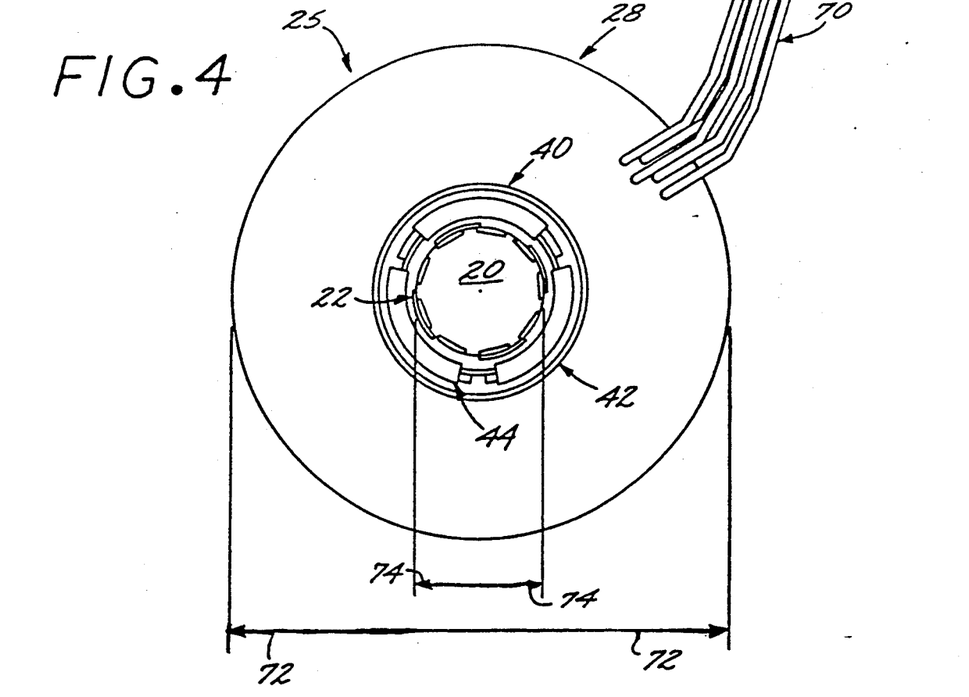
FIG. 4 is a top view of the housing assembly and electrical connections for the position sensor of FIG. 3.

With reference to FIGS. 3 and 4, the rotor assembly 10 and housing assembly 28 are joined by positioning a shim 40 and retaining ring 42 on the upwardly projecting flange 38 of the rotor assembly 10 after the rotor assembly 10 and housing assembly 28 have been mated together so that the shim 40 rests on the back side of the housing assembly 28 and the retaining ring 42 rests on top of the shim 40. After mating as described above, a top portion of the upwardly projecting flange 38 is melted over the retaining ring 42 to form three heat stake regions 44. Heat staking permanently joins the rotor assembly 10 and housing assembly 28. It is anticipated that alternative connection schemes, including non-permanent connection schemes, to heat staking 44 could be used to join the rotor assembly 10 to the housing assembly 28.

Referring back to FIG. 2, the element 26 includes a first resistive track 46 with inner and outer commutator tracks 48 and 50, respectively, positioned adjacently on opposite sides of the first resistive track 46, and a second resistive track 52. As will be discussed below in conjunction with FIGS. 9 and 10, the second resistive track 52 can either be adjacent resistive and commutator tracks, 150 and 152, respectively, similar to the first resistive track 46 and inner and outer commutator track 48 and 50, or the second resistive track 52 can be a series of switch pads 154 disposed about the turns counting rotor 66 so as to be individually contacted by wiper 64. The first resistive track 46 is used to determine the angular position between 0° and 360° of the rotatable shaft relative to a preset position established prior to or during installation of the position sensor 25. The second resistive track 52 is used count the number of complete revolutions of the shaft while it rotates. The resistive tracks 46 and 52 and the commutator tracks 48 and 50 are applied on the surface of the element 26 by conventional techniques well known in the field of potentiometer manufacturing such as spraying, masking, heating metal particles by laser scanning, etc. In addition, voltage connector lines 54, which are preferably a conductive metallic material, are applied to the surface of element 26 and are used to connect the resistive tracks 46 and 52 to electric current. Arrows 56 show that the first resistive track 46 preferably covers an angular rotation of 350° between its terminations at voltage connector lines 54. The element 26 is, of course, an insulative material such as those used in commercial circuit boards.

Like all single turn potentiometers, the detectable voltage varies depending on the position a wiper contacts the resistive track. Hence, the location of wiper 12 on the resistive track 46 and commutator track 50 can be determined by monitoring voltage or resistance. If the percentage of resistance decreases as the wiper 12 moves in a counterclockwise direction on the resistive track 46 and commutator track 50, the percentage of voltage output increases. As shown in FIG. 2, arrows 60 and 62 indicate positions on the first resistive track 46 where, when the wiper 12 is located at those positions, the detected voltage output will be 5% and 95%, respectively. When wiper 12 is located on the first resistive track 46 at any point between the locations of 5% and 95% voltage output, a particular percentage of voltage output will be measured which corresponds to that precise location of the wiper 12. Hence, the position of the shaft, i.e., its degree of rotation between 0° and 360°, can be determined from the percentage of total voltage output which is detected, because the location of wiper 12 on the resistive track 46 varies as a function of the shafts angular rotation, i.e., since the wiper 12 is affixed to the rotor assembly 10 and the rotor assembly 10 is connected by spring clips 22 to the shaft, the wiper 12 will have the same relative position on the first resistive track 46 as the shaft has relative to a preset starting point.

Figures 5, 6:
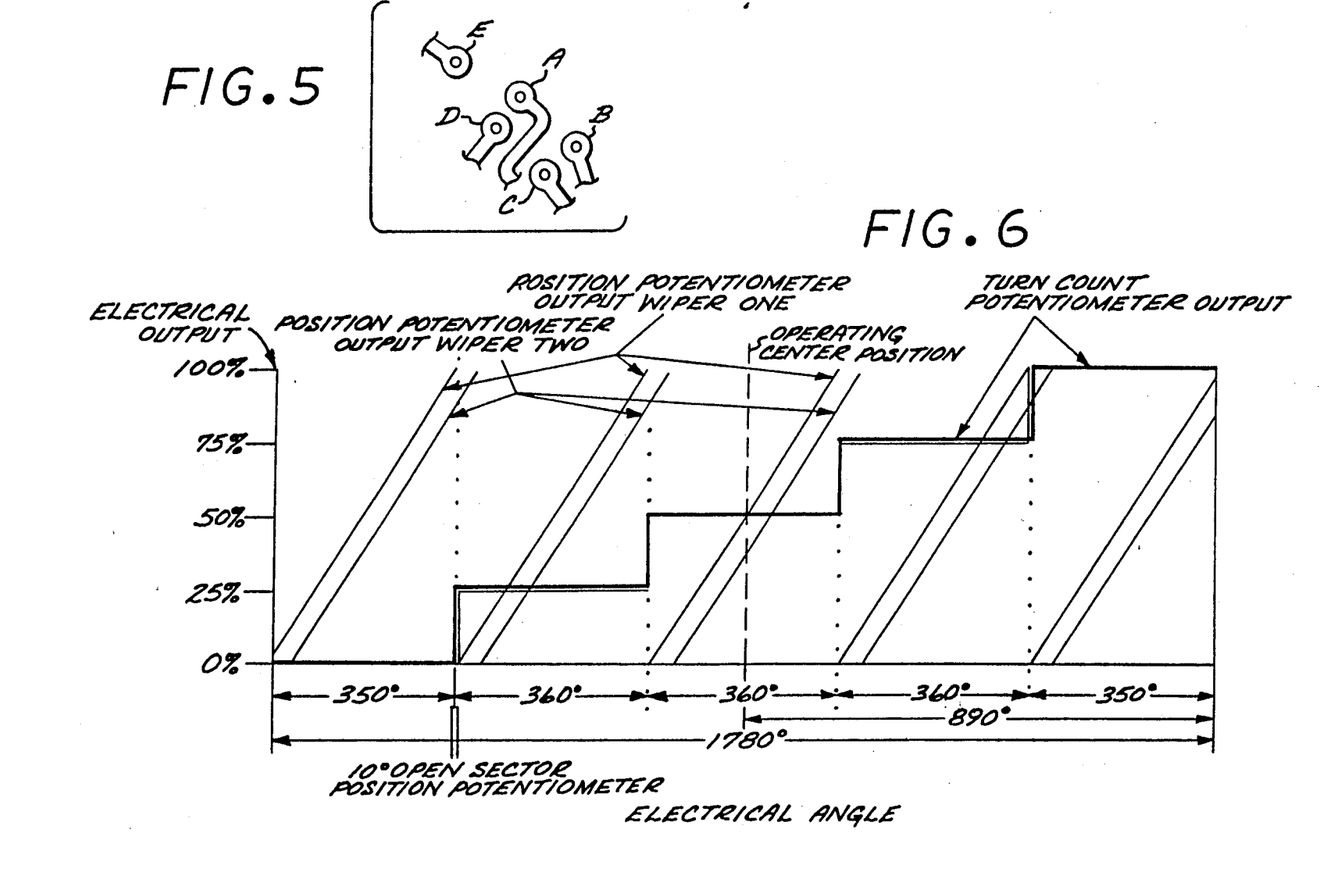
FIG. 5 is an enlarged view of the electrical connections shown on the stator of FIG. 2.
FIG. 6 is a graph showing the percentage of electrical output versus the angular position of the rotating shaft.

FIGS. 2 and 5 show that the element 26 includes connections A-E for voltage and ground to the resistive tracks 46 and 52, A and B, respectively, for sensing the wiper 12 and wiper 14 voltage outputs relative to the first resistive track 46, C and D, respectively, and for sensing the voltage output or the particular connected switch pad E from the wiper 64 of the turns counting rotor 66. FIG. 4 shows that a connector or harness assembly 70 electrically connects the position sensor 25 to the appropriate electrical source and detection circuitry. In one particular environment, it is envisioned that the position sensor will be 50 mm in diameter as indicated by arrows 72, will be mountable on shafts that are 19 mm in diameter as indicated by arrows 74, and will be approximately 13.5 mm in height as indicated by arrows 76 in FIG. 3.

In operation, the position sensor 25 operates by a gear or geneva type movement (named for watch works) wherein output from the first resistive track 46 indicates the relative angle of rotation of the shaft between 0° and 360° from a starting position via the positions at which the wipers 12 and 14 contact the first resistive track, and wherein the wiper 64 for the turns counting rotor 66 is incrementally advanced in a forward or rearward direction such that the number and direction of rotations of the shaft can be determined. As shown in FIGS. 1 and 3, the cog 18 connected to the rotor assembly 10 advances the turn counting rotor 66 by one notch 78 each time the rotor 10 and shaft rotates more than 360°.

Figure 9:
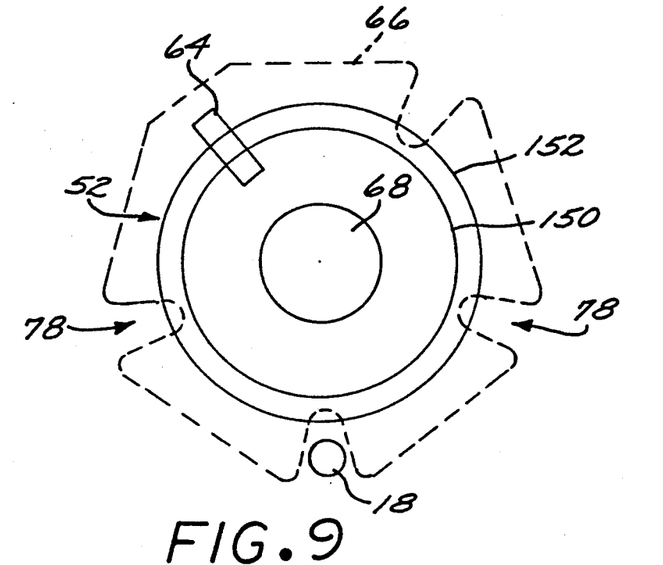
FIG. 9 is a schematic drawing of the turns counting rotor of FIGS. 1, 2 and 3 wherein the wiper contacts both a resistive track and a commutator track and the output is that of a secondary potentiometer and is used to determine the number and direction of revolutions of the rotor of FIG. 1.
Figure 10:
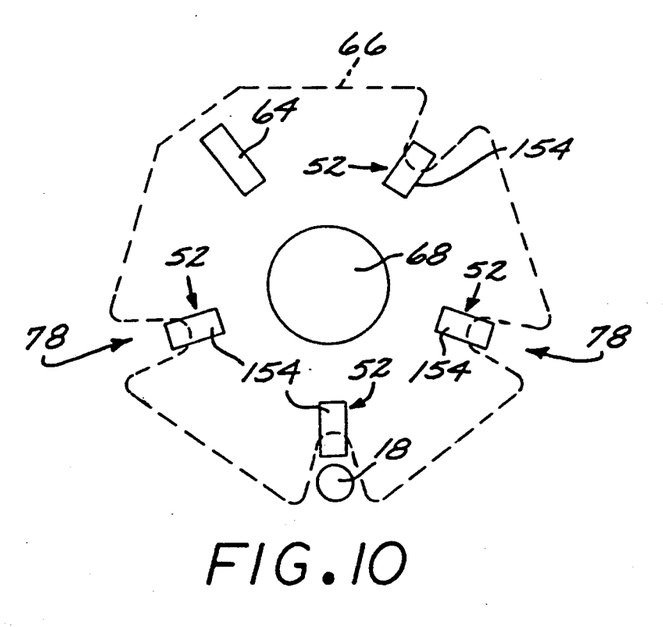
FIG. 10 is a schematic drawing of the turns counting rotor of FIGS. 1, 2, and 3 wherein the wiper on the rotor contacts one of a plurality of switch pads and wherein the particular switch pad contacted indicates the number and direction of revolutions of the rotor of FIG. 1.

With reference to FIGS. 2, 9, and 10, movement of the turns counting rotor 66, in turn, re-positions the wiper 64 at a different location on the second resistive track 52. In FIGS. 9 and 10, the turns counting rotor 66 is shown by dashed lines with the wiper 64 positioned thereon.

FIG. 9 shows that the second resistive track 52 may be comprised of adjacent resistive and commutator tracks, 150 and 152, respectively. If the arrangement in FIG. 9 is used, a percentage change in the voltage output will be sensed each time the turns counting rotor 66 is advanced. In a particular embodiment, the wiper 64 could be preset at a 50% voltage ratio output and the wiper 64 could be incrementally advanced from the preset position on resistive track 150 to give (1) a 25% voltage output when the rotor 10 has rotated one revolution to the left, (2) a 0% voltage output when the rotor has rotated two revolutions to the left, (3) a 75% voltage output when the rotor has rotated one revolution to the right, and (4) a 100% voltage output when the rotor has rotated two revolutions to the right. It is also anticipated that the opposite configuration could be used where the resistive track 150 could be rotated against a stationary wiper 64.

FIG. 10 shows that the second resistive track 52 is comprised of a plurality of switch pads 154 radially positioned around the post 68 which carries the turns counting rotor 66 so that as the wiper 64 is advanced, the wiper 64 will contact a particular switch pad 154 which will indicate the number and direction of revolutions of rotor 10. In a particular embodiment, the wiper 64 could be pre-positioned at a central switch pad 154, as shown in FIG. 10, and be able to advance to two switch pads 154 in the clockwise direction and two switch pads 154 in the counterclockwise direction to indicate two complete revolutions of rotor 10 in either the counterclockwise or clockwise directions, respectively. For example, when the turns counting rotor 66 is advanced one increment in the clockwise direction such that the wiper 64 contacts the next adjacent switch pad 154, the electrical connection between the wiper 64 and the adjacent switch pad 154 will indicate that rotor 10 has made one complete counter-clockwise revolution. It is also anticipated that the switch pads 154 could be a pad grouping, the output of which would be a binary or grey code from which the position of rotor 66 could be determined.

By adding more notches 78 to the rotor 66, and more switch pads 154 if the arrangement in FIG. 10 is used instead of the arrangement shown in FIG. 9, effectively a large number of revolutions of rotor 10 can be counted using turns counting rotor 66, i.e., simply by advancing the turns counting rotor 66 by smaller incremental amounts, larger numbers of revolutions of rotor 10 can be counted. If the arrangement shown in FIG. 9 is used, a smaller change in the percentage of voltage output will occur with a smaller incremental advance of the turns counting rotor 66 and the number of revolutions of rotor 10 that could be counted using turns counting rotor 66 will be limited only by the ability of the circuitry to distinguish the percentage of voltage output as the wiper 64 moves along the resistive and commutator tracks 150 and 152. If the arrangement shown in FIG. 10 is used, the number of revolutions of rotor 10 that can be counted using the turns counting rotor 66 will be limited only by the amount of separate switch pads 154 which can be placed in the path of the wiper 64.

While FIG. 3 shows the turns counting rotor 66 located inside the position sensor 25 and mounted for rotation on post 68 which is affixed to the element 26, the turns counting rotor 66 may be mounted external to the position sensor 25 as the application requires. It is also anticipated that the Geneva mechanism connecting rotor 10 to the turns counting rotor 66, shown in FIGS. 1-3, could be a repeated or "ganged" grouping with several other Geneva mechanisms so as to increase resolution.

Referring to FIG. 6, which shows an electrical output chart, determination of the precise rotational angle of the shaft using the position sensor 25 can be demonstrated by example. Assuming that the position sensor 25 includes both a first resistive track 46 as shown in FIG. 2 and a resistive track 150 as shown in FIG. 9 and the electrical outputs from wipers 14 and 64 are phased to 50% output when the input shaft is set to 50% rotation, i.e. the straight ahead position for a steering wheel or the like, it can be seen that if the turns count rotor 66 output is at 25% and the output from the first resistive track 46 is also at 25%, then the shaft position must be 447.5° from the nominal center location, i.e., dropping from 50% to 25% output for the turns count rotor 66 indicates one complete revolution of the rotor 10 or 360°, and a 25% output of a 350° angle for resistive track 46 indicates a rotational angle of 87.5° (0.25*350), and it follows that 360° plus 87.5° equals 447.5°. A particular advantage of the present position sensor 25 is that the measured output of 25% for the second track 52 and 25% for the first track 46 is unique and will not change even if the power is removed from the position sensor 25. Moreover, even if the shaft is rotated while the power is off, the position sensor will continue to track the rotation due to the mechanical connection with the shaft.

Referring to FIGS. 1, 2, 3 and 6, it will be noted that two wipers 12 and 14, respectively, are used for contacting the first resistive track 46. The redundant arrangement allows for angular position measurements to be made when the wipers 12 and 14 crossover the end terminations 80 and 82 of the first resistive track 46, i.e., note that the first resistive track covers 350° of rotation. An open signal condition would result in the space between the end terminations 80 and 82 if only one wiper were used, and there would be no means for determining the angular position of the shaft for 10° out of every rotation of the shaft. The space between end terminations 80 and 82 must be great enough to avoid electrical shorting. With a very large resistive track 46, the space becomes less and less significant because the open signal condition results for a smaller and smaller angular degree; however, with a small resistive track 46, the space between end terminations 80 and 82 becomes much more significant since a larger angular degree of rotation is represented in the spacing.

In the preferred position sensor 25, the rotor 10 has been fitted with two wipers 12 and 14 which are angularly offset so that wiper 14 leads wiper 12 in the counterclockwise direction of rotation and wiper 12 leads wiper 14 in the clockwise direction of rotation. By monitoring the lead wiper 12 or 14 between the 5% and 95% voltage output points 60, and switching to monitoring the following wiper 12 or 14 while the lead wiper 12 or 14 traverses the end terminations 80 and 82 of the first resistive track 46, the precise angular position of the shaft can be determined throughout the entire 360°. For example, when using an element having a 350° angle and when the wipers 12 and 14 are offset by 45°, the voltage output from the following wiper 12 or 14 should be at 82.14% when the voltage output from the lead wiper is 95%. After the lead wiper 12 or 14 reaches a point on the first resistive track 46 where the sensed voltage output is either 5% and rising or 95% and falling, i.e., after it has crossed over the end terminations 80 and 82, monitoring can be switched back to the lead wiper for angular position calculations. As is shown by the parallel position potentiometer lines for wiper 12 and wiper 14 shown in FIG. 6, the voltage output from the following wiper (in this case wiper 14) allows detecting the precise angular position throughout the 10° open position for the lead wiper when a full rotation of the shaft is being completed.

Figure 7:
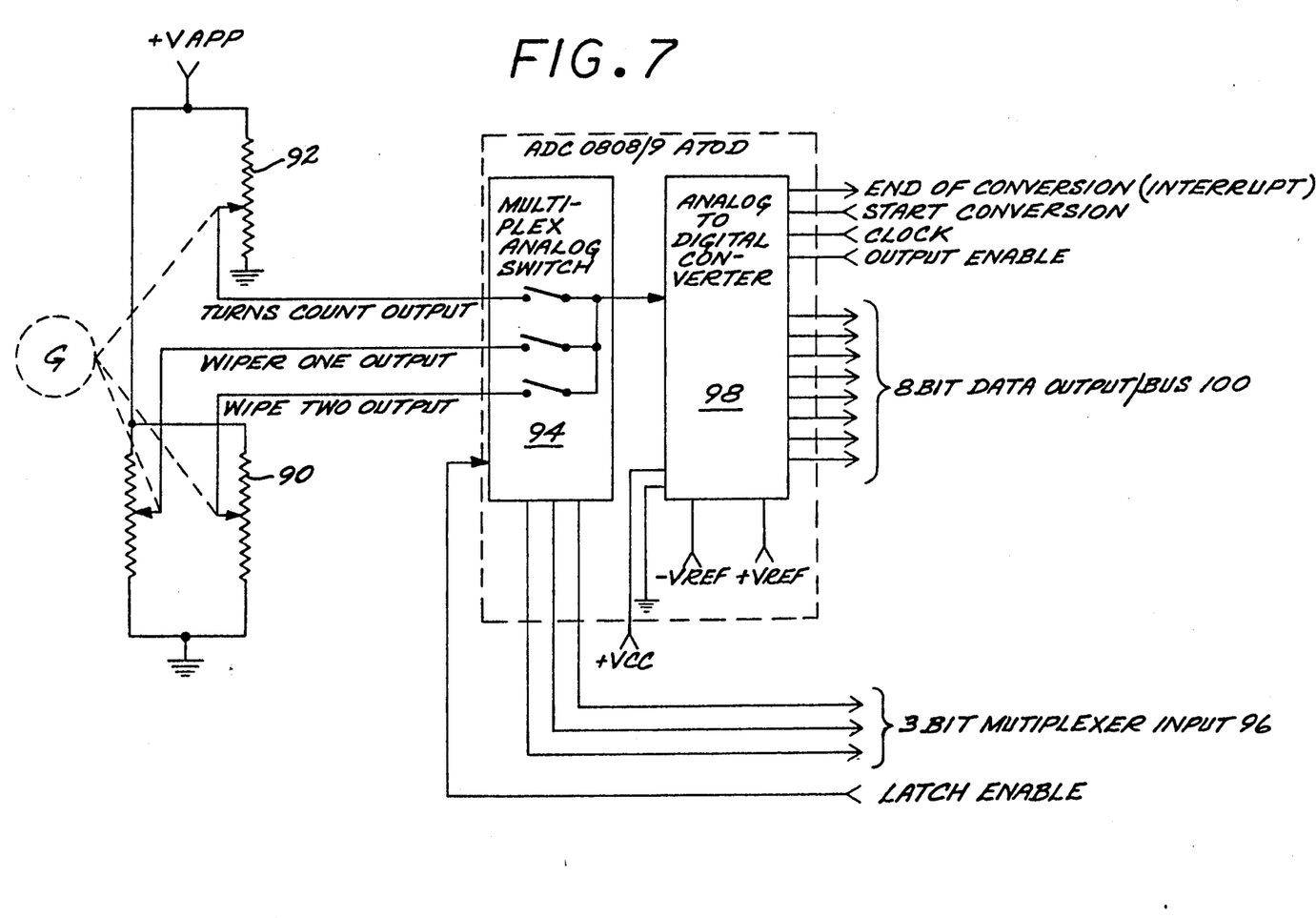
FIG. 7 is a schematic electrical drawing of the turn count and position sensing system.

FIG. 7 shows an electrical diagram of the circuitry used to process the signals from the position sensor 25. The gear or Geneva system G generally represents the position sensor 25 described in FIGS. 1–6 wherein the degree of rotation of the shaft is determined from the electrical outputs from wiper 12 and wiper 14, which are considered together as the position potentiometer 90, and from the position of the wiper 64 on the second resistive track 52, which is considered here as the turn count potentiometer 92. The turns count, wiper one, and wiper two outputs are each fed to a multiplexer 94. A three bit multiplexer input 96 controls the timing by which the multiplexer 94 selects the outputs to be fed to an analog-to-digital (A/D) converter 98. The A/D converter 98 sends the representative digital signals to a microprocessor (not shown) via an eight bit data bus 100 for calculating the angular rotation. Preferably, the processing is such that the angular rotation can be determined on the order of milliseconds.

Figure 8:
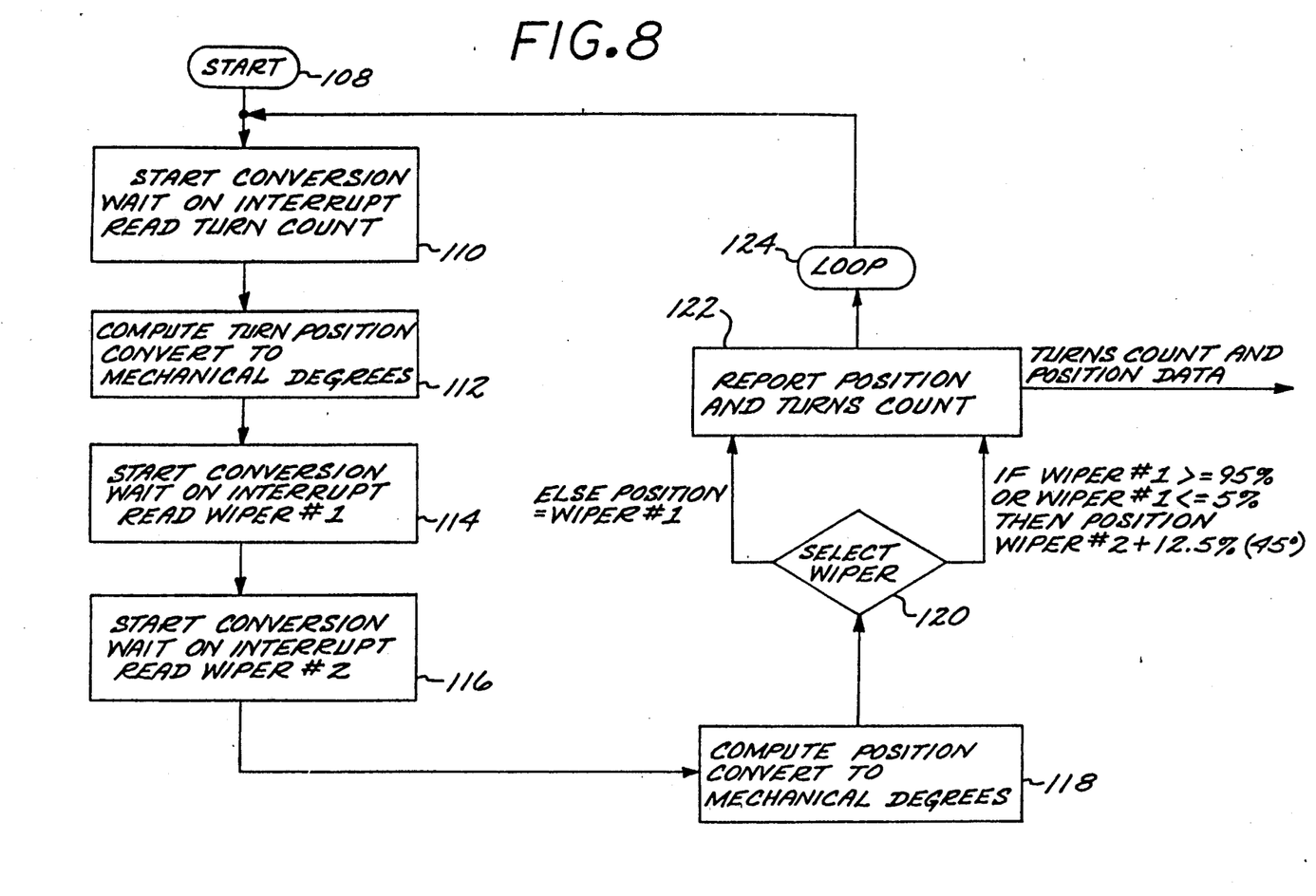
FIG. 8 is a flow chart for determining angular position with the system shown in FIGS. 1–7.

FIG. 8 shows a flow chart for determining the degree of angular rotation using the position sensor described in conjunction with FIGS. 1–6 and the processing circuitry shown in FIG. 7. Upon energization of the position sensor 25, the absolute location of the shaft can be immediately derived by noting the output of the turns count rotor and the position potentiometer output.

After startup 108, in process step 110, the turns count position is sensed and, if switch pads 154 as shown in FIG. 10 are used, the number and direction of revolutions of rotor 10 can be sensed directly simply by identifying the particular switch pad 152 the wiper 64 is contacting and, if a resistive track 150 as shown in FIG. 9 is used, the percentage voltage output from the turns count potentiometer is determined and correlated to the number and direction of revolutions of the shaft. Look up tables may be useful in increasing processing time. After the number of revolutions is determined, this information is either stored or sent directly to the microprocessor as indicated by process step 112.

Next, the routine for computing the precise angular position of the shaft between 0° and 360° is begun. In process steps 114 and 115 the voltage outputs for the two wipers on the first resistive track 46 are determined. In process step 118, the angular position of each wiper is computed according to an algorithm where the wiper 14 position is equal to 350°/256*voltage ratio and the wiper 12 position is equal to 350°/256*voltage ratio less the offset angle, which in the preferred case is 45°. The constant value in the above computations, i.e., 256, is a function of an eight bit encoder being used which can count 256 pulses, i.e. 0 to 255. The algorithm is, of course, dependent on which wiper 12 or 14 is the leading wiper and the degree of the offset angle. In the process step 120, a decision is made to select the wiper 12 or 14 from which the angular position between 0° and 360° will be determined. As described above, the leading wiper can be wiper 12 if the rotor 10 is being rotated in the clockwise direction or the wiper 14 if the rotor 10 is being rotated in the counterclockwise direction.

In process step 122, the absolute wheel position is computed using an algorithm wherein the wheel position is equal to the wiper position in angular degrees plus the turns count in multiples of 360°. Hence, a 740° turn to the right will be two turns counts or 720° from the turns count potentiometer 92 plus a detected 20° from the position potentiometer 90. Process step 124 loops the angular position sensing process back to the beginning of the program. Having the angular position sensing process in a closed loop 124 as shown in FIG. 8 allows the angular position of the rotating shaft to be determined continuously, whereby the angular position information of the shaft becomes useful in systems such as canceling turn signals on an automobile when a turn is complete, providing input to rear steering or suspension mechanism, and the like.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. An angular position sensor, comprising:
   means, having at least two respectively rotationally positionable elements, for sensing an angular position of a shaft between 0° and 360° relative to a fixed starting position, said means for sensing including a means for determining the direction of rotation of said shaft;
   means for counting a number of revolutions of said shaft, said means for counting being advanced incrementally upon a predetermined degree of rotation of said means for sensing, said means for counting including a means for determining the direction of rotation of one of said respectively rotationally positionable elements; and
   means for computing an angle of rotation for said shaft relative to said fixed position from sensed output of said means for counting and said means for sensing.

2. An angular position sensor as recited in claim 1 wherein said respectively rotationally positionable elements of said means for sensing includes a first rotor and a first stator, said first rotor being connected to said shaft and rotatable therewith.

3. An angular position sensor, comprising:
   means, having at least two respectively rotationally positionable elements, for sensing an angular position of a shaft between 0° and 360° relative to a fixed starting position, said respectively rotationally positionable elements including a first rotor and a first stator, said first rotor being connected to said shaft and rotatable therewith, said means for sensing including a means for determining the direction of rotation of said shaft;
   means for counting a number of revolutions by of said shaft through said means for sensing, said means for counting including a means for determining the direction of rotation of one of said respectively rotationally positionable elements; and
   means for computing an angle of rotation for said shaft relative to said fixed position from sensed output of said means for counting and said means for sensing, said means for counting includes a second rotor and a second stator, said second rotor being driven by said first rotor of said means for sensing.

4. An angular position sensor as recited in claim 3 wherein said first stator of said means for sensing and said second stator of said means for counting are positioned on the same element.

5. An angular position sensor as recited in claim 3 wherein said second rotor of said means for counting is located between said first rotor and said first stator of said means for sensing.

6. An angular position sensor as recited in claim 3 wherein said second rotor of said means for counting is located outside a housing created by said first rotor and said first stator of said means for sensing.

7. An angular position sensor as recited in claim 2 wherein said first rotor includes a first wiper and said first stator includes a resistive track, said first rotor and said first stator being adjacently positioned such that said first wiper contacts said resistive track at a first location along said resistive track.

8. An angular position sensor as recited in claim 7 wherein said first rotor further includes a second wiper, said second wiper being positioned on said first rotor such that said second wiper contacts said resistive track at a second location along said resistive track spaced from said first location where said first wiper contacts said resistive track.

9. An angular position sensor as recited in claim 8 wherein said resistive track has a gap between first and second end terminations and wherein said spacing between said first location where said first wiper contacts said resistive track and said second location where said second wiper contacts said resistive track is greater than said gap.

10. An angular position sensor as recited in claim 9 wherein said sensed output from said means for sensing includes a voltage ratio which is dependent upon said first and second locations where said first and second wipers respectively contact said resistive track.

11. An angular position sensor as recited in claim 7 wherein said sensed output from said means for sensing includes a voltage ratio which is dependent upon said first location where said first wiper contacts said resistive track.

12. An angular position sensor as recited in claim 3 wherein said second rotor and said second stator of said means for counting include a wiper and a resistive track, respectively, said wiper positioned on said second rotor so as to contact said resistive track at a particular location along said resistive track.

13. An angular position sensor as recited in claim 12 wherein said sensed output from said means for counting includes a voltage ratio which is dependent upon said particular location where said wiper contacts said resistive track.

14. An angular position sensor as recited in claim 3 wherein said second rotor and said second stator of said means for counting includes a wiper and a plurality of switch pads, respectively, said wiper positioned on said second rotor so as to contact one of said plurality of switch pads.

15. An angular position sensor as recited in claim 14 wherein said sensed output from said means for counting includes an identification of said one of said plurality of switch pads contacted by said wiper.

16. An angular position sensor, comprising:
   means, having at least two respectively rotationally positionable elements, for sensing an angular position of a shaft between 0° and 360° relative to a fixed starting position, said means for sensing including a means for determining the direction of rotation of said shaft;
   means for counting a number of revolutions by said shaft throughs aid means for sensing, said means for counting being advanced incrementally upon a predetermined degree of rotation of said means for sensing, said means for counting including a means for determining the direction of rotation of one of said respectively rotationally positionable elements, said means for counting being connected to said means for sensing by a ganged Geneva mechanism; and
   means for computing an angle of rotation for said shaft relative to said fixed position from sensed output of said means for counting and said means for sensing.

17. An angular position sensor; comprising
a first rotor mounted on a rotatable shaft for which the angular position of said rotatable shaft is to be determined;
a first stator mated with said first rotor so as to allow free rotation of said first rotor relative to said stator;
means for determining the angular position of said first rotor relative to said stator between 0° and 360°;
means for connecting said first rotor to a second rotor, said second rotor being advanced incrementally upon a predetermined degree of rotation of said first rotor; and
means for determining the angular position of said second rotor relative to a preset position.

18. An angular position sensor as recited in claim 17 wherein said means for connecting said first rotor to said second rotor includes a cog mounted on said first rotor which engages a notch in said second rotor.

19. An angular position sensor as recited in claim 18 wherein said predetermined degree of rotation of said first rotor is 360°.

20. An angular position sensor as recited in claim 17 wherein said means for determining the angular position of said second rotor includes a second stator, said second rotor having a means for interacting with said second stator.

21. An angular position sensor as recited in claim 20 wherein said first and second stators are located on the same stationary element.

22. An angular position sensor as recited in claim 20 wherein said second rotor includes a wiper and said second stator includes a resistive track, said second rotor and second stator being arranged such that said wiper contacts said resistive track at a particular location along said resistive track.

23. An angular position sensor as recited in claim 17 wherein said second rotor includes a wiper and said second stator includes a plurality of switch pads, said second rotor and second stator being arranged such that said wiper contacts one of said plurality of switch pads.

24. An angular position sensor as recited in claim 17 wherein said second rotor is positioned between said first rotor and said first stator.

25. An angular position sensor as recited in claim 17 wherein said means for determining the angular position of said first rotor includes a resistive track positioned on said first stator and a first wiper positioned on said first rotor, said first rotor and said first stator being positioned such that said first wiper contacts said resistive track on said first stator at a first location along said resistive track.

26. An angular position sensor as recited in claim 25 further comprising a second wiper positioned on said first rotor, said second wiper contacts said resistive track at a second location along said resistive track spaced from said first location.

27. An angular position sensor as recited in claim 17 wherein said second rotor is connected to said first rotor by a multi-gang arrangement.

28. An angular position sensor, comprising:
a first rotor assembly cpaable of rotating 360°,
a second rotor assembly incrementally driven by said first rotor assembly; and
a stator having both a first resistive track which is contacted by at least one wiper of said first rotor assembly and an electrical path which is contacted by a wiper of said second rotor assembly.

29. An angular position sensor as reicted in claim 28 wherein said first rotor assembly includes at least two wipers angularly offset so as to contact said first resistive track at different, spaced apart, locations.

30. An angular position sensor as recited in claim 28 wherein said electrical path contracted by said wiper of said second rotor assembly is a resistive track.

31. An angular position sensor as recited in claim 28 wherein said electrical path contacted by said wiper of said second rotor assembly is a series of switch pads.

* * * * *